Oct. 16, 1962  E. B. SIMPSON  3,058,540
REPETITIVE SEISMIC SOURCE OPERATION
Filed Feb. 9, 1959
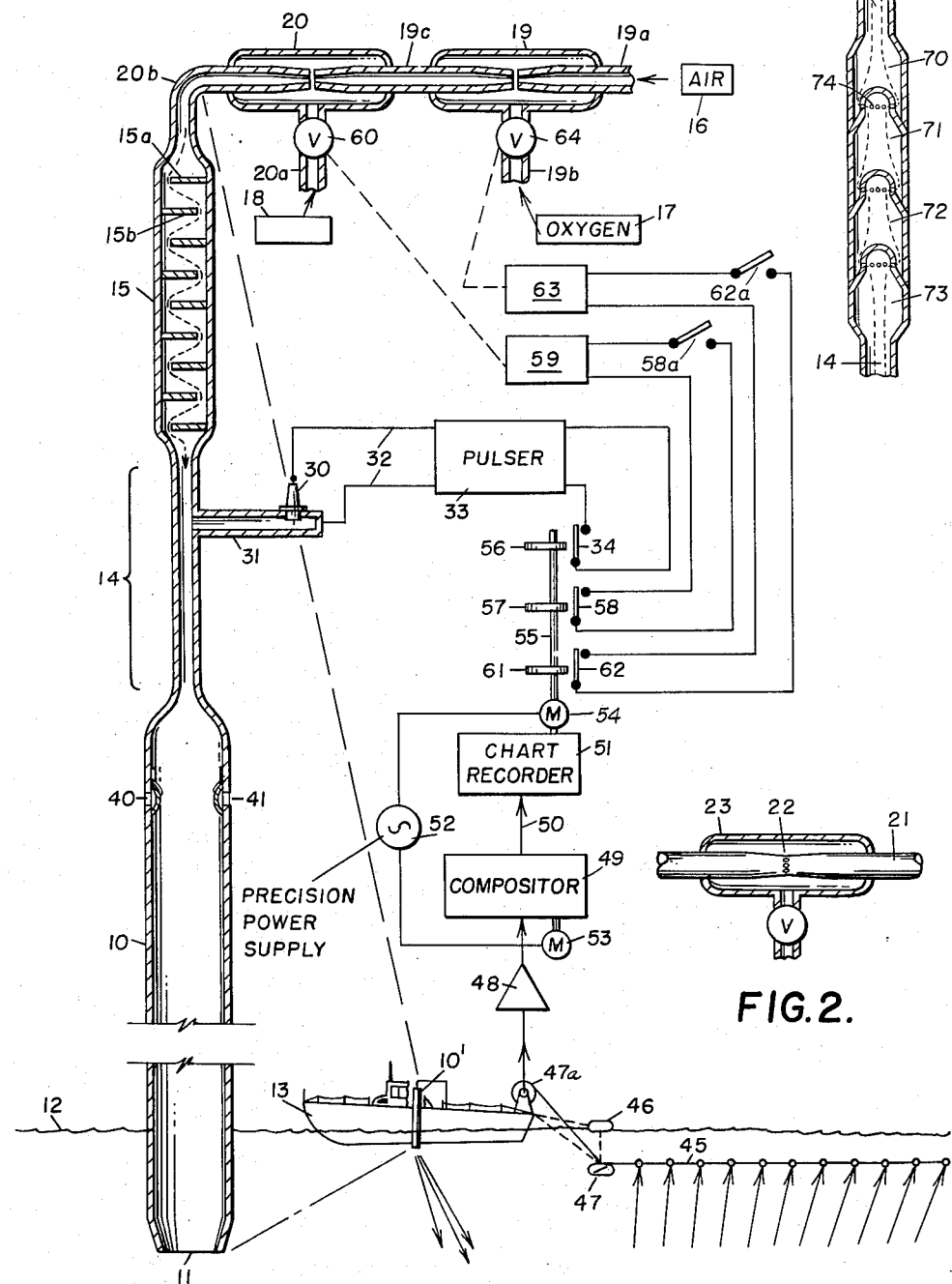
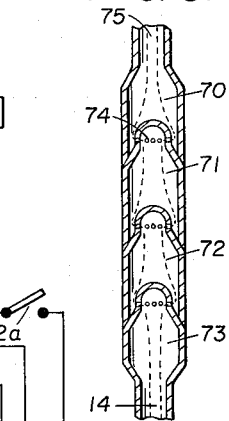

United States Patent Office 3,058,540
Patented Oct. 16, 1962

1

3,058,540
REPETITIVE SEISMIC SOURCE OPERATION
Edward B. Simpson, Arlington, Tex., assignor, by mesne assignments, to Socony Mobil Oil Company, Inc., New York, N.Y., a corporation of New York
Filed Feb. 9, 1959, Ser. No. 792,218
4 Claims. (Cl. 181—.5)

This invention relates to seismic exploration and more particularly to a repetitive seismic pulse source.

In copending application Serial No. 600,804, filed July 30, 1956, now U.S. Patent No. 2,994,397, of William B. Huckabay, a coworker of applicant, a seismic energy source is disclosed in which mixtures of air and propane are repetitively ignited at the upper end of an elongated tube. The lower end of the tube is coupled to the earth by immersion in water. As combustion travels downward through the tube, detonation takes place. The resultant wave of flame front reaches a terminal velocity at the surface of the water substantially in excess of the velocity of sound in air. The resultant impact produces seismic waves.

It is an object of the present invention to provide an improved seismic source in which reliable repetitive operation is achieved. More particularly, applicant provides for the mixing of component fluids and delivery thereof to a chamber in order that uniform time-spaced seismic events may be produced.

In a more specific aspect there is provided a system repetitively loaded with a combustible fluid. More particularly, structure is provided forming an elongated flow channel into which the combined fluid components flow, the flow channel being characterized by a tortuous inlet passage wherein the fluid components are intimately mixed to form a combustible mixture, and further characterized by an elongated smooth-walled tubular member extending from the outlet of said tortuous passage to an outlet port. Means are provided for initiating combustion of the mixture in the region of the juncture between the tortuous inlet passage and the elongated tubular member. Combustion proceeds in both directions. A wave is produced in the region of said outlet port while combustion is extinguished in said tortuous inlet passage.

In a further aspect, there is provided a device for producing seismic impulses which comprises an elongated tubular member having at least three serially connected zones. The zones include a top combustion zone having an ignition means, an intermediate zone, and a lower immersion zone adapted to be inserted in a body of water or the like. A fluid mixing means is also provided which comprises a first flow line and a second flow line. The first flow line receives a continuous flow of fluids providing a combustible admixture and has a cross-sectional area of one dimension. The second flow line is serially connected with the first flow line and has an over-all cross-sectional area at least twice that of the cross-sectional area of the first flow line. Fixed structure in the second flow line provides a tortuous passage therein, whereby the components of the combustible admixture are intimately mixed. The second flow line has also an outlet passage of cross-sectional area of a size comparable to that of the first flow line and is connected to one of the zones of the tubular member.

For a more complete understanding of the present invention and for further objects and advantages thereof, reference may now be had to the following description taken in conjunction with the accompanying drawings in which:

FIG. 1 illustrates a system embodying the present invention with the seismic pulse source shown enlarged and in cross section;

2

FIG. 2 illustrates in cross section a modification of the fluid inductor shown in FIG. 1; and FIG. 3 illustrates in cross section a modification of the mixing unit shown in FIG. 1.

It has been found that uniform repetitive operation may be produced only if component fluids forming a combustible mixture are thoroughly intermingled and dispersed one with respect to the others. It is desirable in seismic exploration that there be uniform time intervals between each ignition and the arrival of a detonation wave at the muzzle of the detonation tube. Seismic records generally are so recorded that variations in time of the order of 1 millisecond are readily detectable. Therefore, operation of a source must be uniform and non-variable within limits preferably substantially less than 1 millisecond. At the same time, it is desirable in many applications to generate like seismic waves repetitively either to provide substantially continuous profile of subsurface formations with a moving system or to enhance the signal-to-noise ratio in a static system. It is an objective of the present invention to provide a mixing system which will permit repetitive operation and more particularly which will be characterized by complete extinction of a first cycle of burning in order that a second cycle may be immediately initiated.

Referring to FIG. 1, there is illustrated a detonator tube 10 having the lower or outlet end thereof 11 immersed beneath the surface 12 of a body of water. The detonation tube 10 is shown highly enlarged and representative of the tube 10' carried by a boat 13. In the form shown, the detonation tube 10 is characterized by a lower portion of substantial diameter and an upper portion 14 substantially reduced in diameter.

In accordance with the present invention, a flow system connected to the upper portion of section 14 is so constructed as to insure proper mixing of component fluids and to insure extinction of combustion thereof following each firing cycle. A combustible mixture is fed to the detonation tube member 14 by way of a mixing chamber 15. The combustible mixture is composed of air from source 16, oxygen from source 17 and a combustible fluid from source 18, each in suitable proportions. Propane gas has been found to be suitable as a combustible fluid. Gas components are fed by way of inductors or mixers 19 and 20 and channel 20b to the mixing chamber 15. The mixture flows from chamber 15 into section 14, to the lower enlarged section of the detonation tube 10 and thence out of the tube through the outlet end 11.

In accordance with one embodiment of the invention, the fluid components flow continuously from sources 16, 17 and 18 to form a combustible mixture. Air is introduced into inductor unit 19 by way of input channel 19a whereas oxygen is introduced through input channel 19b. A housing encompassing a section of the flow channel forms a chamber into which oxygen is introduced. A Venturi nozzle is provided between the input channel 19a and the output channel 19c. Oxygen in the chamber outside the flow channel 19a, 19c is drawn into the stream of air from source 16. The oxygen-air stream is then fed by conduit 19c to a similar inductor unit 20 wherein combustible fluid is introduced by way of conduit 20a.

The output channel 20b is connected to the upper end of the baffled mixing chamber 15. Chamber 15 is formed of a relatively large tube in which a series of baffle plates such as the plate 15a is provided. The plate 15a is D-shaped, having a radius equal the inside radius of tube 15. The circular portions thereof are then welded to the inner surface of the tube 15. The dimension of the plate 15a in direction perpendicular to the free edge, i.e., perpendicular to a line passing through the axis of tube 15, is preferably greater than the radius of the tube 15. A second baffle 15b, and the additional baffles illustrated in FIG. 1, are welded alternately to opposite sides of the tube 15 so that the fluid mixture must follow a tortuous path before entry into the detonation tube member 14. Turbulence thus produced in the fluid stream at each of several points along the flow path tends to thoroughly mix the components so that a uniform combustible gas mixture appears at the output of the chamber 15.

Detonation of the mixture is accomplished by use of a system which includes an igniter unit 30. In accordance therewith, a stub chamber 31 is mounted to and extends perpendicularly from the upper section 14 of the detonation tube. The igniter 30, which conveniently may be a spark plug, is mounted in the stub chamber. Igniter 30 is connected electrically to a pulser 33 by way of channel 32. Pulser 33 actuated by control element 34 periodically excites the igniter 30 to initiate combustion of the mixture.

After combustion of the mixture in the stub chamber 31, the flame front proceeds in both directions. In the downward direction the velocity of the flame front increases until a detonation wave is produced by velocity of the flame front reaching a velocity substantially in excess of the velocity of sound, ultimately attaining a substantially constant velocity. The detonation wave and the combustion products accompanying the same strike the surface of the coupling medium at the muzzle of tube 10 to generate seismic waves.

In the upward direction, as the flame front proceeds through the baffle unit 15, it becomes extinguished by reason of the variation in mixture or the nature of the path or a combination of both. In any event, burning ceases immediately following detonation of one charge of combustible mixture in the detonation tube. Tube 10 is then recharged with combustible mixture by the flow of fluid components from sources 16, 17 and 18.

The baffle chamber 15 thus serves a dual purpose of promoting intimate and thorough mixture of the fluids brought together in a common stream in units 19 and 20 and extinguishing combustion of the mixture. By means of the system thus described, the igniter 30 may be excited at intervals as short as from 1 to 3 seconds, reliably to produce repeated seismic impulses of uniform character and repetition rate.

In operation it has been found preferable to locate the igniter 30 in a branch path or chamber formed by the element 31. Thus shielded, the igniter remains free from fouling or contamination by the water which is introduced into the system in the wake of each detonation wave. Thus, repeated acoustic pulses may be generated.

The detonation tube 10 is provided with a plurality of valves such as valves 40 and 41 to aid in shielding the igniter to prevent fouling thereof. As illustrated, the valves comprise merely hinged flaps which seal openings in the walls of tube 10 when pressures inside the tube exceed the pressure outside. When atmospheric pressure outside the tube exceeds the pressure inside the tube, the valves 40 and 41 open to permit the flow of air therein and thus equalize the pressure and prevent suction of the coupling liquid into the system. In practice, valves 40 and 41 were of the type manufactured and sold by Wm. Powell Co. under the tradename of Powell Swing Check Valves. In practice, four valves were employed providing four inlet ports of one inch diameter each located two feet below section 14. The valves 40 and 41 thus served effectively to shield the igniter 30 and prevent fouling thereof.

With the system thus far described, the boat 13 may proceed along a charted course towing behind it a spread of seismic detectors connected to a cable 45. Cable 45 is maintained at a substantially uniform depth by a float 46 and a depth vane 47 suitably coupled together and to the boat 13. Signals from the cable 45 are applied by way of the reel 47a and amplifier 48 and thence preferably to a system 49 which is adapted to combine signals from cable 45 from prior seismic events. The combined signals are applied to a recorder 51 by way of channel 50. Preferably a precision power supply 52 is provided to drive motor 53 for the compositor 49 and motor 54 for the recorder 51 in a predetermined relationship. Shaft 55 leading from motor 54 supports a plurality of switch actuating cams. A first cam 56 serves to actuate the control elements 34 so that detonation waves are initiated by pulser 33 and igniter 30 repetitively and in synchronism with the chart recorder 51 and the compositor 49. Cam 57 actuates control 58 which is connected by way of switch 58a to unit 59 which may serve to control the flow of combustible fluid from source 18 into the channel 20 by regulating valve 60. Combustible fluid injection may be limited to only about one-half of the time in those operations where pulse rates are on the order of one pulse every three seconds. Similarly, cam 61 actuates control 62 which is connected by way of switch 62a to unit 63 which in turn may control valve 64 to limit the time during which oxygen may flow from source 17. By this means, continuous air flow sweeps the tube free from combustion products following each detonation cycle. Flow of combustible fluid and oxygen is then re-established to supply a desired mixture in the tube 10 prior to succeeding excitation of igniter 30. Conservation of both oxygen and combustible fluid is effected, though repetitive pulse generation is maintained. It has been found that reliable operation may be produced using only air and combustible fluid and that the addition of oxygen serves to increase the magnitude of the energy in the detonation wave as it strikes the water at the outlet port of the detonation tube. However, with or without the addition of oxygen, repetitive operation may be carried out with small variations in the time between ignition at spark plug 30 and the impact of the resultant detonation wave. Tolerable variations may be of the order of one millisecond. It will be appreciated that variations in detonation time will cause data on chart recorder 51 to become generally smeared and less distinct whereas uniform detonation intervals will permit the recording of sharp and distinct lines each indicative of the presence of a subsurface reflecting horizon. While the permissible variation will depend somewhat on the resolution desired, it has been found preferable to limit it to less than one millisecond.

In one embodiment of the invention, the lower portion of the detonation tube 10 was formed of a length of pipe 22′ long and 6″ in diameter. The upper portion 14 of the detonation tube was 2′ long and 2″ in diameter. The stub chamber 31 comprised a short length of 1¼″ pipe closed at the end. It was found preferable to locate the igniter 30 a distance of the order of about 3″ from the axis of the section 14. The opening at the outlet end 11 was 4″ in diameter.

The mixing chamber 15 was a 21″ section of 4″ pipe with six baffles therein spaced about 3″ apart and each extending from the wall of chamber 15 to a point about ¼″ beyond the axis thereof so that the edges of the baffles overlapped each other by about ½″.

In the latter system, flow rates of the following order were employed. Liquid propane was used from source 18 at a rate of 12½ gallons per hour. Flow of gaseous oxygen was at the rate of 750 cubic feet per hour. With the above flow rates preset, the flow of compressed air was gradually increased until repetitive firing took place. Air flow generally was maintained at about the order of 145 cubic feet per minute at 100 p.s.i.

In the ignition system a voltage of the order of 5,000 volts was applied to a spark gap of about ⅛″. Power of the order of 1.5 watt seconds was thus employed.

In FIG. 2 there is illustrated a modified form of an inductor unit similar in operation to units 19 and 20 but in which an unbroken channel 21 has a section of reduced cross-sectional area. At the center section 22 of the channel 21 a plurality of small ports are provided so that the venturi effect is present to draw fluids from chamber 23 into the tube 21. This unit may be found to be satisfactory for entraining oxygen and a selected liquefied petroleum gas (L.P.G.) or other combustible fluid in the air stream.

Referring now to FIG. 3, there is illustrated a modification of the mixing chamber that has been found to be suitable. A plurality of bell-shaped chambers 70, 71, 72, 73 are interconnected by perforations 74 in the walls thereof so that components entrained in an air stream entering the inlet port 75 are thoroughly mixed as they pass through the ports 74 between chambers 70—73. As a result, a combustible gas mixture of uniform character flows from chamber 73 into the upper section 14 of the detonator tube. A mixing chamber of this type is readily formed by utilizing pipe fittings adapted to be welded together. In one embodiment of this system, only a pair of chambers was employed with a single set of perforations in the wall between the two chambers. In any case, intimate and thorough mixing as herein provided permits uniform operation of the system.

The control system, including compositor and chart recorder is shown in block diagram form at 49, 51.

The waves produced by the present system are suitable for conducting seismic exploration to depths of several thousand feet. Chart recorder 51 provides a graphic portrayal of variations of subsurface reflectors. The sound source is particularly suitable in that the predominant frequency of the resultant waves is substantially the same in repeated events and lies within the frequency band ordinarily employed in seismic exploration. The predominant frequency is of the order of from 30 to 100 cycles per second.

While acoustic pulses of high energy are produced when air, oxygen and combustible fluid such as propane form the combustible mixture, it should be understood that where operation at lower acoustic level is satisfactory, a simplified source system may be employed.

Having described the invention in connection with certain embodiments thereof, it will now be understood that further modifications will suggest themselves to those skilled in the art and it is intended to cover such modifications as fall within the scope of the appended claims.

What is claimed is:

1. A device for producing seismic impulses comprising an elongated tubular member, said member having at least three serially connected zones including a top combustion zone having an ignition means, an intermediate zone, a lower immersion zone adapted to be inserted in a body of water or the like, and fluid mixing means comprising a first flow line to receive a continuous flow of fluids providing a combustible admixture and having a cross-sectional area of one dimension, a second flow line serially connected with said first flow line and having an over-all cross-sectional area at least twice that of the aforementioned cross-sectional area of said first flow line, fixed structure in said second flow line providing a tortuous passage therein whereby the components of said combustible admixture are intimately mixed, said second flow line having an outlet passage of cross-sectional area of size comparable to that of said first flow line and connected to one of said zones.

2. The system of claim 1 wherein said fixed structure providing said tortuous passage comprises a plurality of plates each having a cross-sectional area greater than one-half the cross-sectional area of said second flow line and spaced along the length of said second flow line one from the other, each plate having a dimension in direction perpendicular to a line passing through the axis of said second flow line greater than the radius of said second flow line.

3. The system of claim 1 wherein said fixed structure providing tortuous passage comprises at least one baffle within said second flow line dividing said second flow line into at least two chambers, said baffle including a plurality of perforations to permit an agitated passage of fluids between said chambers and through said second flow line.

4. The system of claim 1 in which a plurality of said baffles are provided within said second flow line and spaced one from the other to divide said second flow line into a plurality of chambers numbering one more than the number of baffles.

References Cited in the file of this patent

UNITED STATES PATENTS

| | | |
|---|---|---|
| 1,500,243 | Hammond | July 8, 1924 |
| 2,353,484 | Merten et al. | July 11, 1944 |
| 2,766,837 | McCollum | Oct. 16, 1956 |
| 2,772,746 | Merten | Dec. 4, 1956 |